United States Patent
Butler et al.

(10) Patent No.: US 6,646,546 B1
(45) Date of Patent: Nov. 11, 2003

(54) MULTIPLE-PORT GIGABIT ETHERNET DISTRIBUTION SWITCH

(75) Inventors: Kent A. Butler, Cedar Valley, UT (US); Alma K. Schurig, Cedar Hills, UT (US)

(73) Assignee: Omninet Capital, LLC, Beverly Hills, CA (US)

( * ) Notice: Subject to any disclaimer, the term of this patent is extended or adjusted under 35 U.S.C. 154(b) by 34 days.

(21) Appl. No.: 10/093,360

(22) Filed: Mar. 5, 2002

(51) Int. Cl.[7] .............................................. H04M 11/04
(52) U.S. Cl. .............................. 340/310.06; 340/855.4; 340/855.8
(58) Field of Search ........................ 340/310.06, 853.7, 340/855.4, 855.5, 855.8, 825.5; 375/233, 285, 371, 516; 370/345, 352, 470; 713/310

(56) References Cited

U.S. PATENT DOCUMENTS

| | | | | |
|---|---|---|---|---|
| 4,479,228 A | * | 10/1984 | Crane | 340/825.5 |
| 6,477,200 B1 | * | 11/2002 | Agazzi et al. | 375/233 |
| 6,535,983 B1 | * | 3/2003 | McCormack et al. | 713/310 |
| 6,563,816 B1 | * | 5/2003 | Nodoushani et al. | 370/352 |
| 6,571,181 B1 | * | 5/2003 | Rakshani et al. | 702/60 |

* cited by examiner

*Primary Examiner*—Van Trieu
(74) *Attorney, Agent, or Firm*—Townsend and Townsend and Crew LLP; Kenneth R. Allen

(57) ABSTRACT

An apparatus is provided for deployment in an outdoor environment for managing and distributing Ethernet-type data communication signals. The apparatus includes electrical isolation elements for various electromagnetic effects and a high speed pulse reshaper and repeater. The isolation elements include low capacitance electric pulse suppression devices so that maximum signal distance can be achieved without loss of usable pulse shape and isolation transformers on differential signal pair that retain magnetization at elevated temperatures so that signals are not blocked. As a further feature, a management protocol is included whereby the type of signals can be autonomously distinguished, managed, secured and redirected, thus allowing the apparatus to be operated with compatible devices in a daisy-chained and start switch fabric.

6 Claims, 1 Drawing Sheet

MULTIPLE-PORT GIGABIT ETHERNET DISTRIBUTION SWITCH

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to digital data communications over distance-limited wire media. In particular, this invention relates to an apparatus for managing and distributing Ethernet signals in an outdoor environment.

SUMMARY OF THE INVENTION

According to the invention, an apparatus is provided for deployment in an outdoor environment for managing and distributing Ethernet-type data communication signals. The apparatus includes electrical isolation means for various electromagnetic effects and a high speed pulse reshaper and repeater. The isolation means includes low capacitance electric pulse suppression means so that maximum signal distance can be achieved without loss of usable pulse shape and isolation transformers on differential signal pairs that retain magnetization at elevated temperatures so that signals are not blocked. As a further feature, a management protocol is included whereby the type of signals can be autonomously distinguished, managed, secured and redirected, thus allowing the apparatus to be operated with compatible devices in a daisy-chained and star switch fabric. The invention will be better understood upon reference to the following detailed description in connection with the accompanying drawings.

DETAILED DESCRIPTION OF THE INVENTION

Figure 1:
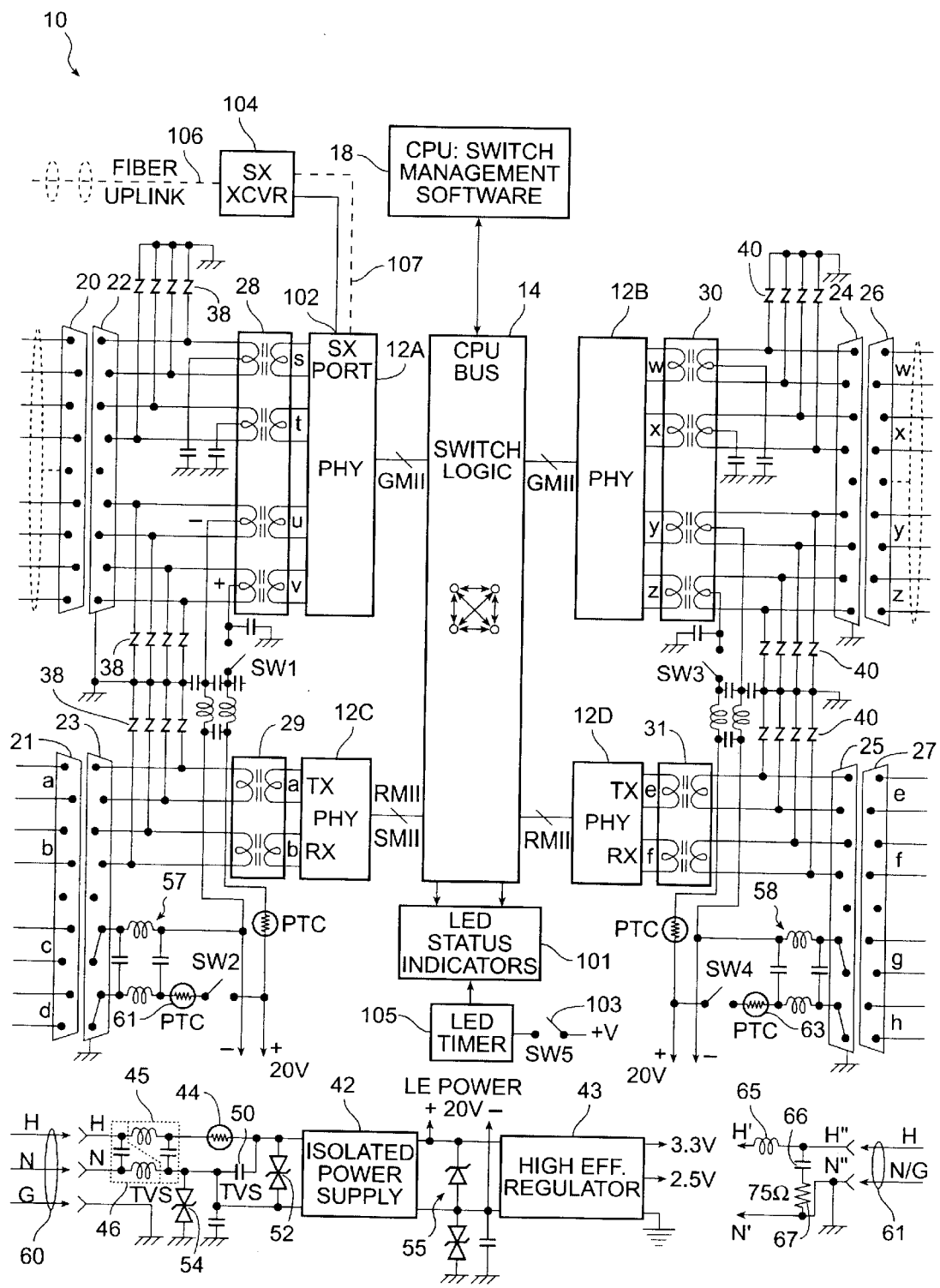
FIG. 1 is a block diagram of an apparatus according to the invention.

FIG. 1 is a block diagram of a packet switch 10 according to the invention. The packet switch 10 is built around a set of pulse shaping and repeating circuits (PHYs) 12A–12D, etc., for shaping and repeating pulses. This circuit set is typically built of an integrated circuit combining independently functional circuits of low-power physical layer transceiver and protocol control devices. Two types are contemplated: a fast Ethernet set 12C, 12D for 10/100 MBPS applications such as drops, and a Gigabit Ethernet device 12A, 12B, with a copper wire interface through multiple differential pairs (TX and RX) s, t, u, v and w, x, y, z and/or a serial interface port (SX) 102 coupled via a light transceiver (SX XCVR) 104 to a fiber link 106. These latter ports support the higher speeds associated with trunk transmissions.

A specific embodiment of a PHY for use in a 10/100 MBPS application is a Model AC104QF PHY quad (four element) device manufactured by Broadcom, Inc. of Irvine, Calif. This circuit is compliant with specific standards, namely the IEEE 802.3u specification and the RMII (Reduced Media Independent Interface) specification. Each 10/100 MBPS PHY typically uses two unshielded twisted pairs for each transmission port, one pair dedicated to transmit signals (pairs a and e) and a second pair to receive signals (pairs b and f). The higher speed ports employ four pairs (s,t,u and v; and w,x,y and z) for data transmission and for data reception. For the three speeds of 10/100M and 1 Gigabit per second, the higher speed PHYs 12A, 12B employ more dedicated channels and transmit and receive according to IEEE 802.3ab. Examples of suitable components are Broadcom Model BCM5402 and Marvel 88E1020 (Sunnyvale, Calif.). The PHY circuit set 12 normally interfaces to a switch or (RS) (Reconciliation Sublayer) of a MAC (media access controller) on one side (not shown) and the hard wired or copper interface on the other side (not shown).

To transmit data, the PHY circuit set 12 converts the digital data stream it receives on one side from switch logic 14 to the appropriate signaling format needed to launch the data-containing signal on the other side. To receive data, the PHY circuit set 12 converts the signals it receives into a digital data stream which is passed up to switch logic 14. The RX ports and the TX ports of the PHYs 12C, 12D are protected through isolation mechanisms from the outside environment. The 10/100 RXD and TXD ports provide interface to internal devices through either an RMII bus or an MII bus (or a RGMII or GMII bus for 1000BaseT PHY devices 12A, 12B).

The packet switch 10 employs an N×N switch fabric 14 for the PHY 12A, 12B, 12C, 12D a switch logic device 14 for coupling, timing and logic control. The functions provided by switch logic devices may include (but are not limited to) the following: 1) storing, switching and forwarding of data for multiple ports at line speed for layer 2 and layer 3 packets, 2) triple speed connectivity (10/100/1000MBPS), 3) MAC address tables with autolearning and aging, 4) four QoS priority levels, 5) stacking support for linking multiple switch logic devices together to increase the number of switched ports and 6) optional management processor support for setup, configuration, maintenance and management. Examples of suitable components are Broadcom Model AL125 with A1320, Broadcom BCM5680, Switchcore CXE-1000 (San Jose, Calif.), and Marvel GT-48370.

The packet switch 10 must deal with arbitrary types of packet signals, so a mechanism is needed to recognize and respond to assure compatibility between signal sources and signal destinations and to manage the routing of the switch fabric 14. To this end, a processor 18 is provided which is coupled to the switch logic 14 via a CPU bus so it can read the status and set up speed and mode of each PHY element (to the extent the Phy elements do not perform these tasks autonomously) and set up the paths through the switch logic 14. Optional processor 18 provides setup, configuration, maintenance and management of switch logic 14 through a PCI bus, DMA bus or other conventional bus. The processor 18 boots and runs embedded management software that resides in off-chip or on-chip memory. A wide variety of management processors (and software suites) is available commercially to service specific switch logic device capabilities. Several types of popular processors include ARM, MIPS and PowerPC. Examples of suitable components are ARM7-based NetSilicon Net +50 (Waltham, Mass.) and Motorola PowerPC MPC850 or 8245 (Phoenix, Ariz.). Some product offerings include processors that are integrated with switch logic devices and attendant memory and "glue" logic, for example, a MIPS processor is integrated into Infineon PLB2800 (Munich, Germany).

A variety of software suites is available commercially to service specific switch logic device capabilities and configuration/management protocols. Operating systems include: proprietary systems sold as VxWorks (Windriver, Alameda, Calif.), RADLAN (Israel) and NET OS of Net Silicon. So-called public domain or open operating systems include Linux. The management software suites include functions that permit the processor to communicate with specific registers called MIBs (Management Information Bases) in the switch logic device 14. Other functions include: 1) TCP/IP stacks for opening packets for Layer 3+ packet management, filtering and security protocols; 2) SNMP (Simple Network Management Protocol) for providing communications security, reading status and statistics registers and controlling switch port operating parameters; and DHCP (Dynamic Host Control Protocol).

A standard has been adopted for electrical and magnetic isolation of electronic circuitry intended to be operated in a severe outdoor environment. The standard is referenced as IEEE 802.3u, IEEE 802.3ab and ANSI X3.236. The specifications provide for operation in a temperature range between 0 and 70 C. For extended operation between −40C and +85C., which is more typical of actual experience in some environments, as well as the extremes of current and of voltage transients, construction of devices merely compliant with this standard is inadequate for reliable operation.

Accordingly, the packet switch 10 of the invention incorporates a number of features that go beyond standards compliance. Connectors 22, 23, 24, 25 used on the switch 10 are female DB-9 connectors that mate with DB-9 connectors 20, 21, 26, 27. This type of connector is an industry standard but it is not known to have been commercially used for Ethernet signals. However, its pins provide 360 degree surface area coverage, and mating connectors provide 360 surface coverage for the pin area and are connected through solid mechanical connections and held together with two screws. The signal connectors would normally be expected to be of type RJ-45. However, such connectors are not as robust or as reliable for the intended use as the chosen connectors.

In order to provide the needed electrical isolation, isolation elements 28, 29, 30 and 31 with an extended temperature rating are used for voltage isolation and EMI suppression. The isolation elements 28–31 typically provide one isolation transformer per twisted pair or 2 to 4 isolation transformers per port in addition to common mode and EMI suppression chokes/filters and line impedance resistors (not illustrated.) Isolation elements 28–31 may be incorporated into a single, dual or quad port isolation module. Shunted across each of the wiring connections 34 and 36 to ground between the connectors 22, 23, 24 and 25 and the isolation elements 28–31 are for example SiBar (a brand of Raychem Corporation of Menlo Park, Calif.) (Model TVB170) or SIDACtor (a brand of Teccor of Irving, Tex.) (Model P2604UA) bi-directional overvoltage suppression devices 38, 40. They suppress voltages above a certain threshold, typically around +/−170 V. This voltage protection is intended to protect the packet switch 10 from damage or destruction by indirect lightning strikes or other causes such as power line faults. Low capacitance suppression devices permit operation of Ethernet signals over cable distances of 150 m.

Use of DB-9 connectors permits the use of shielded pair network cable of shielded CAT5/6 type that reduces EMI radiated from the network cables to levels acceptable for deployment in certain sensitive jurisdictions and residential areas. The shield ring of the DB-9 connector can be connected to the chassis ground to permit extension of this ground to the n shield of the network data cable.

A high efficiency isolated power supply system 42 is used to convert power received from upstream (24–240 VAC/VDC) to provide low voltage (15–22 VDC) for powering remote line extenders and remote packet switches and for driving a high efficiency switching regulator 43 that provides the voltage needed to power the PHYs, switch logic and processor, namely 2.5 VDC and 3.3 VDC, and to the other active devices. An auto resettable positive temperature coefficient (PTC) fuse 44 is used to stop current flow when it becomes too high. This provides short circuit protection. When excessive current flows through the fuse, the characteristics of the material change from low impedance to high impedance causing the current flow to cease. The fuse 44 stays in this state until the power is turned off and the fuse has cooled down enough that the material changes back to a low impedance. This permits remote reset of the fuse 44 by momentarily turning off network power. The ambient temperature has an effect on the threshold at which the fuse 44 takes on the high impedance state. The higher the temperature, the lower the amount of current required to cause the fuse to go into a high impedance state.

EMI filters 45–48 are placed in the ground and positive lines of the power source lines from both connectors. The EMI filters 45–46 together with associated shunt capacitors suppress both voltage and current anomalies. In addition, there is both a differential transient voltage filter capacitor 50 built around a double Zener diode or TVS 52 (transient voltage suppressor) placed between the positive voltage and ground return line and a common mode transient voltage protector built around a double Zener diode or bi-directional TVS 54 placed between the ground return line (neutral) and the chassis ground. Similar isolation 50 is provided between the power supply 42 and the regulator 43 where line extender (LE) power or network power is derived. In this manner, the packet switch 10 is effectively isolated from both unwanted common mode and differential transients. Hot and neutral leads are isolated, while the ground lead is tied to the chassis. The regulator 43 is tied to earth ground so the modules can be daisy chained with a common power source.

Additional EMI filters 57, 59 are placed in the 20 VDC ground and positive lines that transfer power through the DB-9 connectors to other switches, line and drop extenders. SW1, SW2, SW3 and SW4 are representative of switches for enabling power to their respective ports only when the packet switch 10 is connected to that port. PTCs 61, 63 in series with the positive 20 VDC lines protect the power supply 42 against short circuits to the data cables.

Network power may be provided from a variety of network power sources and voltages. The connector 60 provides for connection from 12-2 shielded outdoor Romex-type power cable. Shielding is required by the electrical code in certain jurisdictions for specific voltage ranges. The connector 60 can be a push tab, barrier lug strip or standard NEMA equipment receptacle for equipment closet AC power. The push tab strip permits connection of up to 4 or more cables for distribution of network power to branches/segments of the network. Also illustrated is a coax connector 61 for optional alternative connection to cable TV power systems carried by the signal-bearing coax. An RF filter is illustrated that blocks RF while passing 50/60 Hz 60–90 VAC quasi square wave cable system power to power supply 42. The RF filter 64 has a series RF choke 65, and a shunt capacitor 66 and a termination resistor 67 between hot and neutral, and the neutral is tied to chassis ground.

Two important but competing practical considerations are addressed by the device 10: power consumption and ease of identifying status. Components are employed that are inherently high efficiency and low in power consumption so that heat generation is minimized and power is not wasted. To provide status indication, LED status indicators 101 are provided to monitor and report the status of each port of the switch logic 14. LEDs are inherently high in power consumption. Therefore, a power switch 103 is provided which is manually engaged by the user/service worker, and an LED power timer 105 is provided that automatically times out the status indicators 101 when not in use for a period of time.

Other features that save power is the disable control 107 which disables the PHY 12A SX ports s, t, u, v whenever the SX transceiver has been engaged. This is a hard-wired feature, since the fiber port is an alternative to the copper port.

The invention has been explained with reference to specific embodiments. For example, the 100BaseT RMII PHY has been illustrated because it particularly requires the use of the present invention for implementation. Other embodiments will be evident to those of ordinary skill in the art. It is therefore not intended that this invention be limited, except as indicated by the appended claims.

What is claimed is:

1. An apparatus for bidirectional distribution of packet-switched digital data signals over distance-limited wire media suitable for deployment in an electrically-harsh environment comprising:

a first multiple-pin connector configured to carry first input signals in at least a first differential pair, to carry first output signals in at least a second differential pair, and to carry power;

a second multiple-pin connector configured to carry second input signals in at least a third differential pair, to carry second output signals in at least a fourth differential pair, and to carry power;

a power line;

a ground line;

electromagnetic chokes adjacent ingress locations in the power line;

electromagnetic chokes adjacent ingress locations in the ground line;

transient voltage protection means between the power line and the ground line;

a low-capacitance electric pulse suppression means between each element of said first and second differential pairs and ground adjacent each said first and second connector;

pulse shaping and repeating circuits each coupled with a single one of said connectors to receive a set of input signals and to output a set of output signals, said circuits for shaping and repeating pulses of said input signals received and for transmitting said output signals;

isolation transformers coupled between said connectors and said pulse shaping circuits for common mode transient and voltage isolation and for electromagnetic interference filtering of said differential pairs, said isolation transformers being capable of maintaining magnetizing inductance at elevated temperatures;

a switching logic device coupled to said pulse shaping and repeating circuits for selectively coupling input signals originating from one of said connectors to output signals at another one of said connectors; and a processor means for analyzing sources and destinations of packets, for distinguishing between types of input signals and output signals, for managing control signals for compatibility and for establishing switching paths.

2. The apparatus according to claim 1 wherein said switching logic device and said pulse shaping and repeating circuits comprises means operative to distinguish between full duplex and half duplex as well as to sense speed.

3. The apparatus according to claim 1 wherein said pulse shaping and repeating circuit is a low-power physical layer transceiver and protocol control device.

4. The apparatus according to claim 1 further comprising:

a third multiple-pin connector configured to carry third input signals in at least a fifth differential pair, to carry third output signals in at least a sixth differential pair, and to carry power; and a fourth multiple-pin connector configured to carry fourth input signals in at least a seventh differential pair, to carry fourth output signals in at least an eighth differential pair, and to carry power.

5. The apparatus according to claim 1 further comprising:

a status indicator means coupled to the switching logic device for indicating status of ports;

switching means to manually engage the status indicator means; and timer means for timing out the status indicator means when status is not being actively monitored.

6. The apparatus according to claim 1 further including means for disabling inactive ports upon engagement of selected port.

* * * * *